Patented Sept. 25, 1928.

1,685,301

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

TREATMENT OF POLLUTED WASTES.

No Drawing.   Application filed July 9, 1928.   Serial No. 291,381.

This application constitutes a continuation in part of my co-pending application, Serial No. 79,319, filed January 5, 1926.

The invention relates more specifically to the treatment of polluted wastes of the character of acidified water, such as waste waters from mines and industrial plants. It is essential to the purification of such waste waters that the acid content thereof be neutralized to prevent the killing of fish life in, and the pollution of, the streams receiving the mine water.

Acidified waters from mines constitute a great menace to the many comparatively small streams which receive these waters throughout the mining districts of the country.

The present invention relates to an improved method for effecting the neutralization of the acid content of such waste liquors and contemplates the passage of the waste water through porous calcium carbonate, such as travertine in its natural state.

Travertine is characterized by the fact that it is extremely porous and therefore provides numerous points of contact for the water with the travertine, thus permitting the calcium carbonate content of the travertine to effectually neutralize the acid content of the water, so that such waste acid waters when reaching the receiving stream or other body of water into which the same may be discharged, will be entirely free from acid and will not endanger fish life or in any way affect vegetation along the banks of the receiving stream or body of water.

The calcium carbonate of the travertine is relatively soluble and will neutralize any free sulphuric acid in the water passed therethrough in accordance with the following reaction:

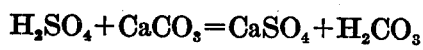

$$H_2SO_4 + CaCO_3 = CaSO_4 + H_2CO_3$$

The travertine is preferably employed in the form of comparatively small lumps so that the water will percolate through the mass of travertine and permeate the multitudinous pores in the lumps thereof.

Due to the porosity of the travertine, the mine water is permitted to contact with extremely large areas and to dissolve substantial quantities of the calcium carbonate from the travertine.

It will be appreciated that suitable means may be provided for retaining the travertine in proper form and position to permit the passage of the acidified waste water therethrough. As, for example, the travertine may be maintained in a series of successive chambers or zones through which the liquid is caused to successively pass in a circuitous route.

Having thus described my invention, what I claim is:

1. A method for treating acidified polluted waste water comprising causing the polluted waste water to enter the pores of calcium carbonate characterized by the fact that it has a porosity substantially the same as travertine in its natural state and be subjected to the neutralizing action of the latter.

2. A method for treating polluted waste comprising causing the polluted liquid to be subjected to the action of travertine in its natural state.

3. A method for treating polluted waste comprising causing the polluted liquid to filter through a mass of lumps of travertine.

4. A method for treating polluted wastes comprising causing the polluted waste liquid to pass through a plurality of chambers containing travertine in the form of lumps.

JOHN T. TRAVERS.